United States Patent [19]

Vogt

[11] 4,320,430
[45] Mar. 16, 1982

[54] RECORDING DISC CARTRIDGE CLOSURE MECHANISM

[75] Inventor: Noland E. Vogt, Woodside, Calif.

[73] Assignee: Memorex Mini Disc Drive Corporation, Santa Clara, Calif.

[21] Appl. No.: 138,778

[22] Filed: Apr. 10, 1980

[51] Int. Cl.³ .................... G11B 23/02; G11B 5/012; G11B 5/52

[52] U.S. Cl. .................................. 360/133; 360/86; 360/97

[58] Field of Search ................ 360/133, 97, 98, 99, 360/86, 131, 132; 235/475, 483; 242/179, 197

[56] References Cited

U.S. PATENT DOCUMENTS

| | | | |
|---|---|---|---|
| 3,593,327 | 7/1971 | Shill | 360/133 |
| 3,899,794 | 8/1975 | Brown | 360/86 |
| 4,120,012 | 10/1978 | Bowers | 360/133 |
| 4,208,681 | 6/1980 | Hatchett | 360/97 |

*Primary Examiner*—Robert M. Kilgore
*Attorney, Agent, or Firm*—Limbach, Limbach & Sutton

[57] ABSTRACT

A selectively openable closure mechanism for a magnetic recording disc cartridge for cooperating with a probe member connected to a disc drive unit provides for selectively opening access through an aperture in the cartridge to the interior thereof when the cartridge is inserted into the drive unit and the closure-actuating probe member is received into the cartridge and for closing access to the aperture when a cartridge is removed from the drive unit and the probe member is withdrawn from the cartridge, the mechanism including an arcuate guide track formed in at least one of the top or bottom panels of the cartridge, at least one arcuate door slidably carried by the guide track for selective movement between a closed position and an open position and structure connected to the door for engaging and capturing the probe member upon its reception into the cartridge and for driving the door from the closed position to the open position and back to the closed position upon insertion and withdrawal of the probe with respect to the cartridge, with the capturing structure preventing withdrawal of the probe from the cartridge except when the door is substantially in the closed position.

7 Claims, 6 Drawing Figures

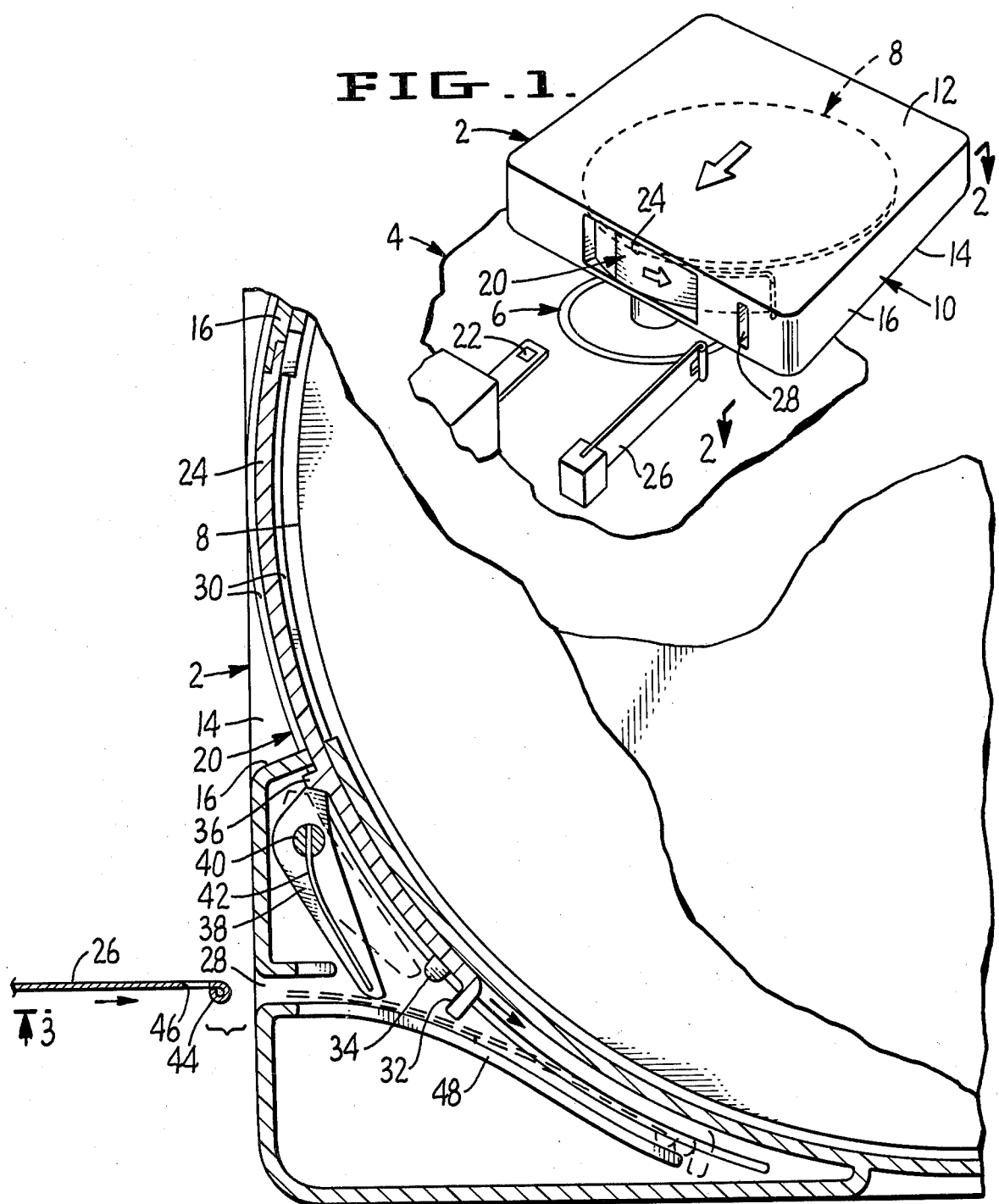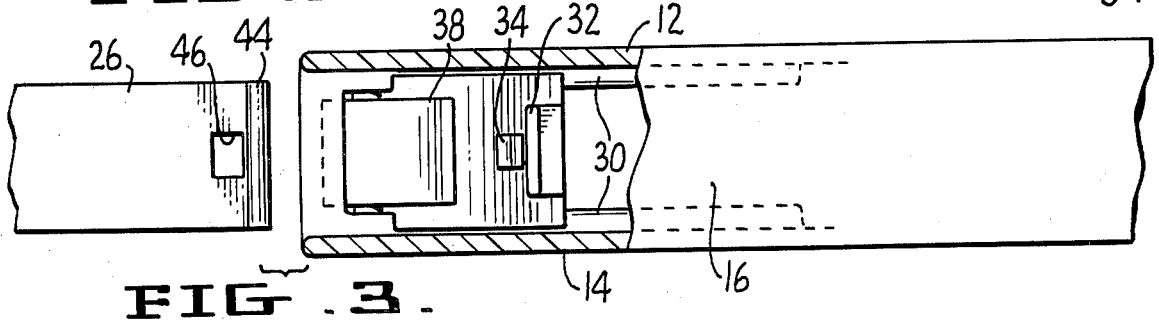

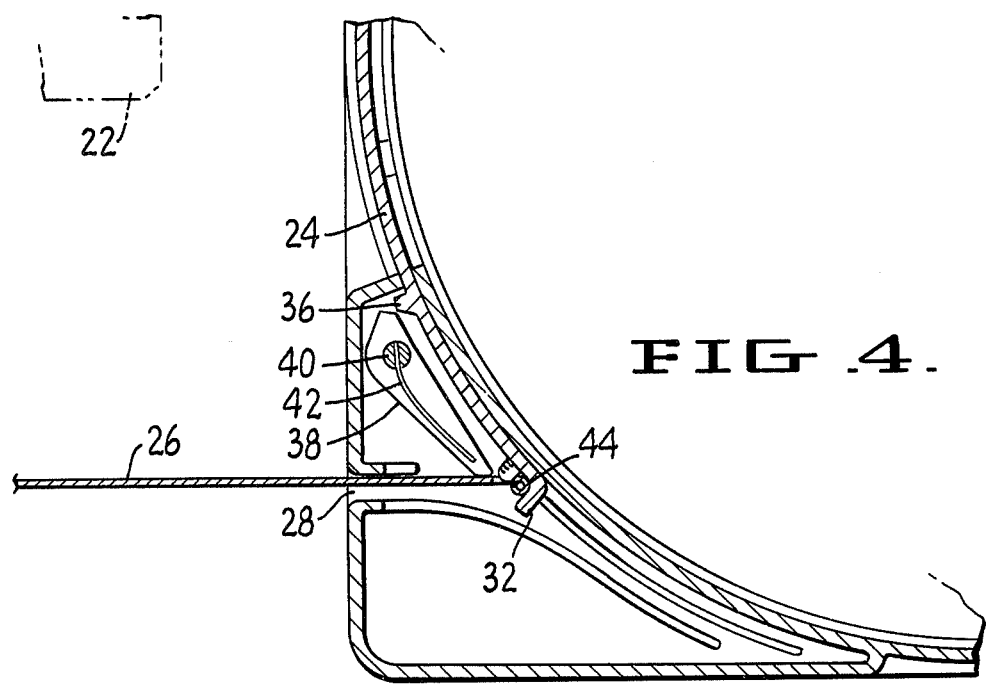
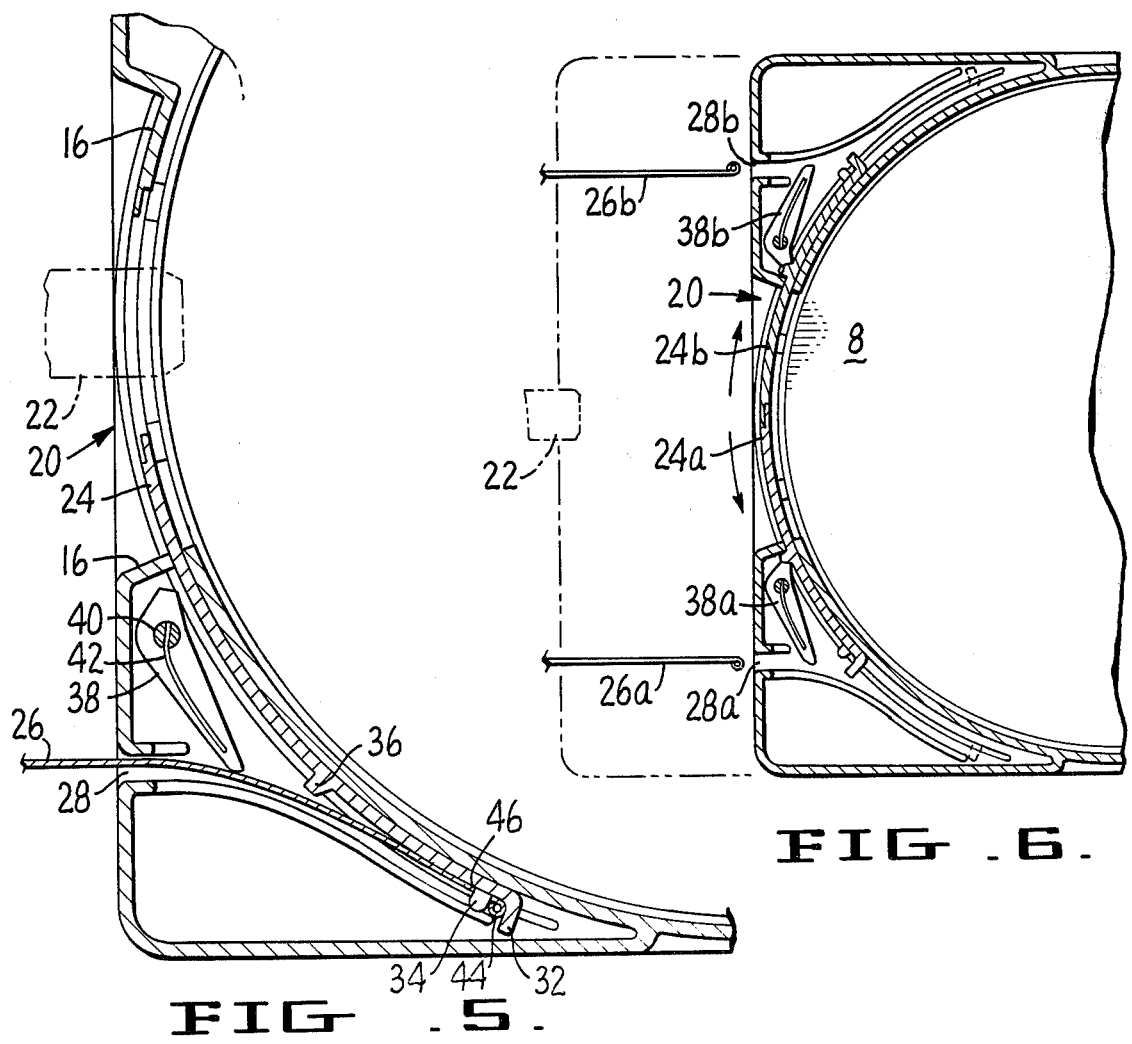

RECORDING DISC CARTRIDGE CLOSURE MECHANISM

BACKGROUND OF THE INVENTION

This invention relates generally to magnetic disc recording apparatus utilizing recording disc housed in cartridge enclosures. More particularly, it relates to such recording disc cartridges which substantially enclose the recording disc with a selectively openable and closable aperture providing access for the recording and playback transducer when the cartridge is in place in a disc drive unit. Even more particularly, the invention relates to a closure mechanism for use with such cartridges and disc drive units.

In magnetic disc recording units various types of recording media are used. These types include fixed discs which are made a substantially permanent part of the entire recording system, and removable discs, which permit interchange of blank and recorded media for varying requirements. There are various types of removable media, including disc packs which, when installed on the disc drive unit, have their protective housing substantially removed to provide access to the various recording surfaces. Another popular and well known type of removable media is that of the disc cartridge, incorporating one or a plurality of recording discs within an enclosing cartridge housing, which housing includes a selectively openable aperture through which the recording and playback transducers are introduced to the disc recording surfaces. Such a cartridge housing is designed to remain in place around the recording disc whether the disc is removed from the drive unit for storage or is installed in an operable relation with the drive unit.

Recording disc cartridges necessarily provide some form of selectively openable closure for selectively covering and uncovering the aperture through which the recording and playback transducers are introduced into the cartridge. This is necessary because it is important and desirable to maintain the cartridge closed when it is removed from the protective environment of the disc drive unit to avoid contamination of the recording surfaces by foreign matter, such as dust and fingerprints. It is thus important that this closure be opened when the cartridge is inserted into the unit and closed when it is removed therefrom.

In the prior art various types of closures have been utilized, including pivoting doors which swing upwardly or to the side under the actuation of mechanisms associated with the disc drive, and other doors which slide transversely to the side of the aperture upon insertion of the cartridge into the drive unit. Where space is at a premium, the pivoting doors are disadvantageous, since they require sufficient room to swing open. The various types of transversely moving doors have reduced the space requirement but have suffered from various disadvantages stemming from their designs. One type of such closure has employed a flexible, foil-like door which is pulled off to the side and around a corner by the insertion of a portion of the disc drive unit into the cartridge, with a spring urging the closure back to its closed position upon withdrawal of the cartridge from the drive unit. Another approach utilizes a rack and pinion arrangement in which a part of the drive unit forms a rack engaging and rotating a pinion within the cartridge by the insertion of the cartridge into the drive unit, with this rotation both serving to roll the closure door away from a closed position and also winding a coiled, clock-type spring, the wound spring providing the force to urge the door back to a closed position.

While these prior art arrangements have provided the basic necessary functions, they have suffered from numerous disadvantages. These disadvantages stem, to a large extent, from the use of spring biasing arrangements to effect closure and retention of the door structure in a closed position. Any weakness in the spring may cause the door to close less than fully, thus permitting contaminants inside. This problem is exacerbated by the fact that the door, in its substantially closed position, approaches the limit of effort of the spring such that the final closing force and force retaining the door closed may be relatively low. This problem also has rendered the door mechanism susceptible to inadvertent opening and thus undesired potential entry of contaminants into the interior of the cartridge.

SUMMARY OF THE INVENTION

To overcome the foregoing disadvantages of the prior art cartridge closure mechanisms, it is an object of the present invention to provide such a closure mechanism which is positively opened upon insertion into a drive unit and positively closed upon removal therefrom.

It is a further object of this invention to provide such a mechanism which is sufficiently positive in its operation that the door will be positively closed before the cartridge is capable of normal removal from the drive unit.

To achieve these and other objects of the invention, which will become apparent below, there is provided a closure mechanism for a magnetic recording disc cartridge, which cartridge is insertable into a drive unit having a closure-actuating probe member received into the cartridge upon such insertion, the cartridge including a disc enclosed within a housing having generally planar top and bottom panels and peripheral panels extending therebetween with an aperture in the peripheral panels for receiving magnetic transducer heads therethrough into the interior of the housing. The selectively openable closure mechanism provides for selectively opening access to such aperture when the cartridge is inserted into the drive unit with the closure-actuating probe member received into the cartridge, and for closing access to such aperture when the cartridge is removed from the drive unit and the probe member withdrawn from the cartridge. This mechanism comprises an arcuate guide track concentric with the disc and formed in at least one of the top or bottom panels and having a radius of curvature greater than the maximum radius of the disc and extending adjacent the aperture, and a door arrangement extending between the top and bottom panels. This door arrangement includes at least one arcuate door slidably carried by the guide track for selective movement between a closed position generally covering the aperture and an open position exposing at least a portion of the aperture, and also includes means connected to the door for engaging and capturing the probe member upon its reception into the cartridge and for driving the door from the closed position to the open position and back to the closed position upon insertion and withdrawal of the probe with respect to the cartridge, the capturing means preventing withdrawal of the probe member from the cartridge except when the door is substantially in the closed position.

BRIEF DESCRIPTION OF THE DRAWINGS

Two particularly preferred embodiments of the mechanism of this invention will be described in detail below with respect to the drawings in which:

FIG. 1 is a perspective view of a cartridge according to one embodiment of the invention, utilizing a single door, being inserted into engagement with a disc drive unit;

FIG. 2 is an enlarged, fragmentary sectional view taken along line 2—2 of FIG. 1, with the probe member of the drive unit about to begin its reception into the cartridge, with the broken line representation illustrating the configuration upon full reception of the probe member into the cartridge;

FIG. 3 is a sectional elevational view of the apparatus of FIG. 2, taken along line 3—3 thereof;

FIG. 4 is a sectional plan view corresponding generally to that of FIG. 2, illustrating the probe member in a condition of partial reception into the cartridge;

FIG. 5 is a sectional plan view of the apparatus of FIG. 2 illustrating the configuration with the probe member fully received within the cartridge; and FIG. 6 is a sectional plan view of a second embodiment of the apparatus of this invention utilizing a pair of mutually opposed door structures.

DETAILED DESCRIPTION OF PREFERRED EMBODIMENTS

FIG. 1 illustrates schematically a recording disc cartridge according to this invention as it is being inserted into operative relationship with a disc drive unit. The cartridge, generally indicated by reference numeral 2, is insertable into the drive unit, generally indicated by reference numeral 4, initially in a direction indicated by the arrow atop the cartridge and then generally vertically down into engagement with the disc drive spindle 6. The cartridge 2 includes a magnetic recording disc 8, shown in phantom, enclosed within a housing 10 having a generally planar top panel 12 and bottom panel 14 and peripheral panels 16 extending therebetween, the panels being formed of a suitable synthetic resin. On one side of the cartridge housing there is provided an aperture 20 for receiving the drive unit magnetic transducer heads 22 therethrough into the interior of the cartridge housing. A selectively openable door 24 comprises part of the closure mechanism for selectively opening access to the cartridge interior through aperture 20 when a cartridge is inserted into the drive unit 4 and when drive unit probe member 26 is received into the cartridge, such as through probe aperture 28.

To effect the smooth and carefully guided insertion of the cartridge into the drive unit, an appropriate carriage and guides (not shown) may suitably be provided if desired.

While the drive unit 4 illustrated schematically in FIG. 1 is shown only with a few of the rudimentary components thereof, it is to be understood that such drive unit also includes the additional conventional components of such a drive unit, including the necessary electronics, disc drive motor and the like. However, since these additional components form no part of this invention they have been omitted for clarity of illustration of the significant features of this invention.

In the sectional plan view of FIG. 2 are illustrated in greater detail and a much larger scale some of the more significant components of this preferred embodiment of the present invention. In addition to the components described with respect to FIG. 1, there is provided in at least one of the top or bottom housing panels 12 or 14, and preferably in both, an arcuate guide track 30 having a radius of curvature greater than the maximum radius of the disc 8 and extending adjacent the aperture 20 for guiding the door 24 in its movement. As shown in FIG. 2, the arcuate door 24 in its closed position substantially covers access to the interior of the cartridge through the aperture 20 by its engagement on one side with a portion of the peripheral panel 16 and by extending past the edge of the peripheral panel 16 at the other end of the aperture 20.

Connected to the door 24, and suitably formed integrally therewith at the end remote from the aperture 20, is lip 32 a boss or tab 34 for engaging and capturing the probe member 26 upon its reception into the cartridge, in a manner to be described below. The door is also provided with a latching boss 36 which is positioned such that, when the door is in its closed position, as shown in FIG. 2, the boss 36 is adjacent the portion of the peripheral panel 16 which forms the lower edge of the aperture 20 in FIG. 2, and on the opposite side of that peripheral panel from the aperture 20. This door latching boss 36 is positioned to be engaged, when the door is in its closed position, by latch member 38 in the manner shown in FIG. 2. Such latch member 38 is pivotally mounted to the cartridge housing by its reception over pivot post 40 which is attached to the cartridge housing. Additionally, a resilient member, such as leaf spring 42, urges the latch member 38 in a clockwise direction to the position illustrated by the solid line representation of FIG. 2. This latch member 38 is thus mounted for pivotal movement between the two positions illustrated by the solid line representation and the broken line representation of FIG. 2. When the latch member 38 is in the position illustrated in the solid line representation of FIG. 2, it engages boss 36 on the door member 24 and thus holds the door in its closed position, positively restraining any attempted movement of the door toward an open position. As shown most clearly in FIG. 2, the probe member 26, which may suitably be formed of spring steel or similar material, includes at its outer end a rolled lip 44 for engaging the door lip 32 and an aperture 46 for receiving the door tab 34 therethrough to effect capturing of the probe member by the door, as illustrated in the open-door phantom line representation of FIG. 2 and also in FIG. 5.

FIGS. 2, 4 and 5 illustrate the sequential events occurring as the cartridge 2 is inserted into operative relation with the drive unit 4. FIG. 2 represents the position illustrated in FIG. 1 when insertion is just begun, prior to reception of the probe member 26 into the cartridge through aperture 28. As insertion of the cartridge 2 continues, the rolled outer end 44 of the probe member 26 is received through cartridge aperture 28, as shown in FIG. 4, and into engagement with the probe engaging lip 32 of the door 24. Because the tail of the pivotally mounted latching member 38 projects across the path of entry of the probe member 26, this reception of the probe member 26 into the cartridge necessarily effects an unlatching pivoting of the latch member 38 to the position illustrated in FIG. 4. Thus, this projecting tail of the latching member 38 may be considered to constitute an unlatching means to effect release of the engagement and positive restraint between the latching member 38 and the tab 36 on the door 24. In the position illustrated in FIG. 4 the outer extremity of the probe member 26 has just engaged the lip 32 of the door 24, such that further insertion of the cartridge 2 into the drive will effect deeper reception of the probe member 26 and thus initiate opening of the door, now unlatched.

Such further insertion is illustrated in FIG. 5, which represents the relationship between the probe member 26 and the cartridge 2 with the cartridge in substantially its fully inserted position into the disc drive unit. Such full insertion has necessarily effected deep reception of the probe member 26 into the cartridge, thus forcing the door around its arcuate track to a position opening a substantial portion of the aperture 20 for reception of the transducer heads 22, shown in phantom into the cartridge. As shown most clearly in this figure, such reception of the probe and actuation of the door has caused the probe member 26 to flex so that the boss 34 on the door 24 is received through the aperture 46 adjacent the outer end of the probe member 26. During this flexing, the curved probe guide wall 48 of the cartridge 20 assists in guiding the probe member 26 into its full reception within the cartridge and in maintaining firm engagement between the probe member 26 and the door lip 32 and tab 34. The reception of the boss 34 through the aperture 46 effects a capturing of the probe member 26 by the door 24 so that the cartridge may not be removed from the drive and the probe withdrawn from the cartridge without positively advancing the door back to its closed position, illustrated in FIG. 2. Obviously, the sequence of events involved in removing the cartridge 2 from its operative engagement with the drive unit 4 will comprise a reversal of the steps of insertion.

FIG. 6 illustrates a variation of the closure mechanism of FIGS. 1 through 5 in which a pair of closure mechanisms, comprising substantially mirror images of one another, are provided with a pair of arcuate doors 24a and 24b selectively movable between a closed position in mutual engagement with one another and an open position spaced away from one another. This arrangement, while exactly analogous to the single door mechanism described in detail above, provides for a substantially broader opening of the aperture 20 for the same amount of relative movement between the cartridge 2 and the probe member 26a and 26b. Since the components of this dual closure mechanism embodiment may suitably comprise a simple duplication of the components described with respect to FIGS. 1 through 5, the same reference numerals with the suffix a and b are employed, and the method of insertion and removal of the cartridge with respect to the drive unit is substantially identical.

In contrast with other closure mechanisms utilizing spring loaded doors, it may be seen that the mechanism of the present invention provides not only for positive opening of the doors upon insertion of the cartridge into the drive unit, but also for positive closing of the door 24 (or doors 24a and 24b) covering the aperture and positive latching thereof as a precondition of removal of the cartridge from the drive unit. Such positive closing and latching provides a substantial additional measure of security to the recording disc 8 contained within the cartridge.

While the foregoing represents two particularly preferred embodiments of the apparatus of this invention, it is to be understood that this description is provided solely for purposes of illustration of the principles of this invention, and is not to be considered limitative thereof. Accordingly, since numerous variations and modifications of this apparatus, all within the scope of the invention, will readily occur to those skilled in the art, the scope of this invention is to be limited solely by the claims appended hereto.

What is claimed is:

1. For a magnetic recording disc cartridge which is insertable into a drive unit having a closure-actuating probe member which is received into the cartridge upon such insertion, such cartridge including a disc enclosed within a housing having generally planar top and bottom panels and peripheral panels extending therebetween with an aperture in said peripheral panels for receiving magnetic transducer heads therethrough into the interior of the housing for cooperation with the recording disc therewithin, a selectively openable closure mechanism for selectively opening access to said aperture when the cartridge is inserted into such drive unit and the closure-actuating probe member is received into the cartridge, and for closing access to such aperture when the cartridge is removed from the drive unit and the probe member is withdrawn from the cartridge, such mechanism comprising an arcuate guide track concentric with said disc and formed in at least one of said top or bottom panels and having a radius of curvature greater than the maximum radius of said disc and extending adjacent said aperture; and door means extending between said top and bottom panels, said door means including:

at least one arcuate door slidably carried by said guide track for selective movement between a closed position generally covering said aperture and an open position exposing at least a portion of said aperture, and means connected to said door for engaging and capturing said probe member upon its reception into said cartridge and for driving said door from said closed position to said open position and back to said closed position upon insertion and withdrawal of said probe with respect to said cartridge, said capturing means preventing said withdrawal of said probe member from said cartridge except when said door is substantially in said closed position, whereby the door will be positively closed before the cartridge can be removed from the drive unit.

2. The mechanism of claim 1 further comprising latch means attached to said cartridge for selectively engaging and positively restraining movement of said door means when said cartridge is removed from said drive unit, whereby the door means is positively held closed against accidental opening when the cartridge is removed from the drive unit.

3. The mechanism of claim 2 wherein said latch means includes unlatching means for engaging said probe member upon its reception within said cartridge to effect release of said engagement and positive restraint of movement of said door means when said cartridge is inserted into said drive unit.

4. The mechanism of claim 2 further comprising resilient biasing means urging said latching means into said engagement and positive restraint of said door means.

5. The mechanism of claim 1 wherein said door means comprises a single said arcuate door slidably carried by said guide track and so movable between said open position and said closed position.

6. The mechanism of claim 1 further comprising two closure-actuating probe members; wherein said door means comprises a pair of said arcuate doors slidably carried by said guide track and selectively movable into mutual engagement in said closed position and away from one another into said open position; and each of said probe members adapted to activate each of said arcuate doors.

7. The mechanism of claim 1 wherein said probe member engaging and capturing means comprises tab means connected to said door for reception through an aperture in said probe member when said probe member is received within said cartridge and said door is moved thereby away from said closed position.

* * * * *